United States Patent [19]
DeWitt et al.

[11] Patent Number: 4,697,405
[45] Date of Patent: Oct. 6, 1987

[54] MOWING APPARATUS

[76] Inventors: Carl DeWitt, Box 126, Rte. 2, Cobden, Ill. 62920; Gerald A. Fink, R.R. 2, Box 228, Murphysboro, Ill. 62966

[21] Appl. No.: 813,053

[22] Filed: Dec. 24, 1985

[51] Int. Cl.⁴ .................. A01D 75/18; A01D 55/18
[52] U.S. Cl. .......................... 56/10.4; 56/10.2; 172/26; 280/87.2; 104/244.1
[58] Field of Search ............ 56/10.4, 16.7, 14.7, 56/15.2, 15.4, 17.5; 172/5, 6, 26; 280/87.2; 104/244.1

[56] References Cited

U.S. PATENT DOCUMENTS

| | | |
|---|---|---|
| 2,838,901 | 6/1958 | Davis .................. 56/10.4 |
| 3,115,739 | 12/1963 | Thoen et al. ............ 56/10.4 |
| 3,498,036 | 3/1970 | Cowling et al. .......... 56/10.4 |
| 3,526,083 | 9/1970 | Barry et al. ............ 56/10.4 |
| 3,535,861 | 10/1970 | Fineman ................ 56/10.4 |
| 3,599,403 | 8/1971 | Gantz .................. 56/10.4 |
| 3,665,685 | 5/1972 | Allard ................. 56/10.4 |
| 3,750,376 | 8/1973 | Cioni .................. 56/10.4 |

FOREIGN PATENT DOCUMENTS 1461426 12/1966 France .................. 56/10.4

Primary Examiner—Robert Peshock
Assistant Examiner—John G. Weiss
Attorney, Agent, or Firm—Kalish & Gilster

[57] ABSTRACT

A mower for mowing under fences or guardrails and the like has trailer mounted multiple rotary mower units including a first multiple blade unit for rotating on a vertical axis around posts and for mowing under and behind the fence or guardrail and a single rotary mower unit for mowing under the fence or guardrail on the inside. Both units having vertical and horizontal movements to desired positions adjacent to and under the guardrail or fence. The trailer is steered automatically parallel to the fence or guardrail being mown by a spring-loaded steering axle and steering linkage including a pressure wheel running against the guardrail or fence. The inside and outside mowers can be rotated into travel positions so the entire unit can be towed by tractor, truck, or other vehicle upon highways.

16 Claims, 9 Drawing Figures

MOWING APPARATUS

BACKGROUND AND SUMMARY OF THE INVENTION

This invention relates to apparatus for mowing vegetation, and more particularly, to mowing apparatus for mowing under and on both sides of a fence or guardrail.

In the maintenance of highway right-of-ways, parks, commercial properties, and various landscaped areas, as well as in agricultural use generally, it is often required to control vegetation under guardrails and fences. This presents certain problems for mowing, due to the difficulty of reaching under the guardrail with existing mowing apparatus, and also presents the problem of mowing around posts or other vertical supports of a guardrail or fence. Controlling vegetation under guardrails and fences typically has been achieved heretofore by means of hand mowing, chemical sprays or by mowers reaching part way under the rail from one side at a time. The present invention involves the provision of a trailer-mounted mowing apparatus including multiple mower units which permits mowing under and along both sides of a fence or guardrail in one pass. The problem of mowing around posts is overcome by using novel apparatus having a unit including a series of rotary mowers, with the unit rotating about a vertical axis for permitting the rotary mowers to rotate as part of the rotatable unit upon contact with a post. The opposite side of the fence is mown by a single mower unit of the apparatus.

The apparatus includes a unique follower arrangement for keeping the mowers in place, under, and adjacent to the fence or guardrail by utilizing a steerable axle on the trailer which carries the mower frames.

The apparatus is designed to be pulled by any tractor having a standard drawbar and power take-off shaft. The power for the mowers and frame adjustments is provided by a self-contained hydraulic system on the trailer powered by the tractor power take-off or by an engine mounted on the trailer.

The multiple mower unit, which is used to mow the outside of the fence or guardrail, is supported by a telescoping boom attached to the trailer frame. Such boom can be adjusted vertically by hydraulic means, and is of telescoping character. The telescoping beam can be extended to position the multiple mower unit on the outside of the fence or guardrail, and includes means for rotating a suspension arrangement for the multiple mower unit to bring it into mowing position. Also provided is means for permitting the multiple mower unit to swing safely out of the way in the even of striking obstructions either from the direction of movement, or from the side. The multiple mower unit rotates upon its axis upon contact with a post to cause rotation of a successive mower blade into position beneath the fence or rail for uninterrupted mowing.

A single mower unit similar to the multi-mower unit is used to mow the inside of the fence or guardrail. The single mower unit is also supported by a telescoping boom attached to the trailer frame. The entire boom can be adjusted vertically by hydraulic and electronic means, moved horizontally by a telescoping boom, and can rotate horizontally about its vertical offset support within predetermined limits. The single mower unit comprises a single rotary mower powered by a hydraulic motor or other prime mover. In operation, the mower is adjusted vertically and horizontally into the desired position projecting under the fence or guardrail. The unit contacts each post, rotates clear, and is returned automatically to the predetermined position under the fence or guardrail.

The trailer is comprised of a single axle chassis and frame suitable for towing behind a tractor, car, or truck. It carries the supporting frames for the multi-mower outside unit, the single mower inside unit, hydraulic fluid reservoir, hydraulic motors, pumps, and cylinder or equivalent. The trailer automatically follows a line of travel parallel to the fence or guardrail. The axle of the trailer is steerable by means of a tongue supported underneath the trailer frame. A spring pulls the tongue and steers the trailer toward the fence of guardrail; and a horizontal wheel contacts the fence or rail with enough pressure to offset the spring. This counteraction of spring steering the trailer toward the fence, the horizontal wheel contacting the guardrail or fence and steering the trailer away from the fence cause the trailer to travel parallel to the fence or guardrail offsetting movement of the towing unit toward or away from the guardrail or fence. A hydraulic cylinder permits locking the steerable axle into a straight ahead mode for travel.

The trailer with the inside and outside mowers fully retracted can be towed upon a highway.

Accordingly, among the several objects of the invention may be noted the provision of improved mowing apparatus, which is particularly useful for controlling vegetation under guardrails and fences; which provides for mowing under and along both sides of guardrails and fences; which provides for mowing of vegetation in close proximity to posts or other vertical supports of a fence or guardrail; which provides automatic tracking or following of a fence or guardrail without close operator supervision; which provides mowing under and on both sides of a guardrail or fence with far greater speed, efficiency, and effectiveness than has heretofore been achieved; which is simply and reliably, as well as economically constructed so as to provide marked economy and reliability of usage; which is particularly useful for highway right-of-way maintenance, as well as maintenance of commercial and private grounds, particularly those which are landscaped and include fences or guardrails; which is useful in agriculture for mowing along fences, guardrails, hedgerows, and other boundary-defining vegetation or structures; and which can be utilized for mowing along buildings and other boundary-defining structures along grounds covered with vegetation to permit mowing more closely to such border or boundary than has heretofore been achievable; and which does not require in use a high degree of operator skill, maintenance or attention.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
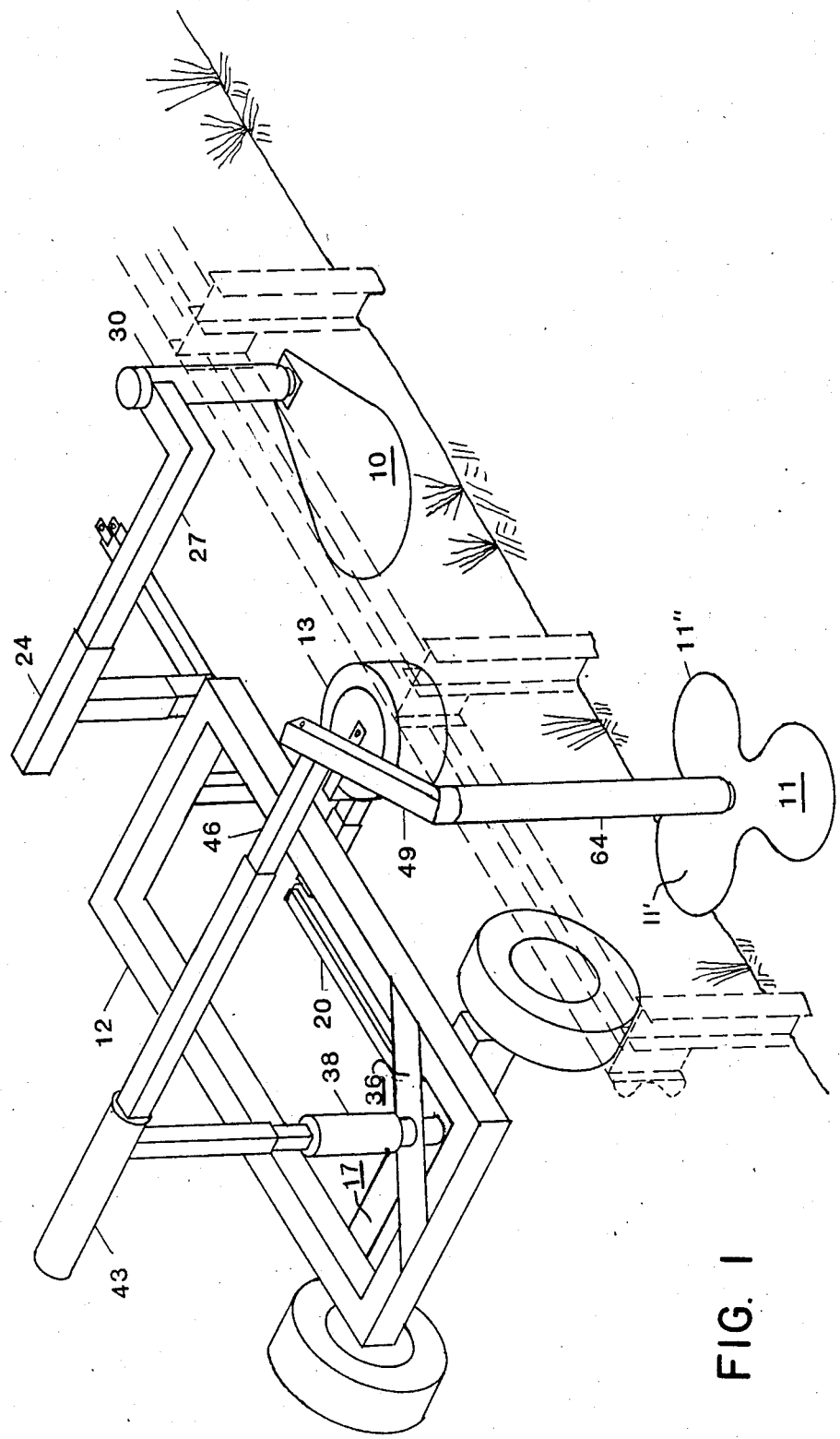
FIG. 1 is a perspective view of mowing apparatus constructed in accordance with and embodying the present invention.

Looking at FIG. 1, the invention is illustrated for utilization behind a tractor or similar towing vehicle. The mower comprises two rotary mowing heads; a first head 10 being a single blade head to trim the vegetation on the inner side of a post supported fixture such as guardrail, fence or other type barrier. A second head 11 is a multi-blade mower head to trim the vegetation between and behind the previously described posts.

The mowing heads are supported and carried on a trailer type frame 12 as illustrated in FIG. 1. The frame maintains a uniform height of the mowing heads above the ground. A unique feature of the frame is the ability to maintain a uniform horizontal relationship of the mowing heads and the posts. This uniform relationship is maintained by pressure wheel 13.

Figure 2:
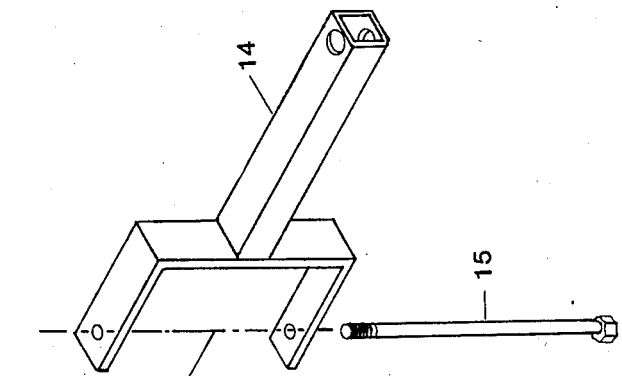
FIG. 2 is an exploded view of a pressure wheel and support arrangement thereof utilized in a follower arrangement of the invention.

A pressure wheel 13 is illustrated in FIG. 2 along with a support fork 14 and a vertical axle 15. A support fork 14 is supported in a guide 16 illustrated in FIG. 3. Guide 16 is attached to the right side of frame 12 and normal to its primary horizontal axis. Support fork 14 will freely slide in guide 16 and both have a rectangular cross section to prevent rotation of fork 14. Frame 12 is carried by an axle 17 shown in phantom view on FIG. 3, axle 17 being a conventional steerable type as used on the front of a farm wagon or similar two axle towed unit. Transport wheels 18 are free to rotate horizontally about the ends of axle 17 for steering. Wheels 18 are connected by a tierod 19 to maintain a parallel relationship and control the horizontal rotation for steering.

A steering arm 20 is supported from axle 17 and is free to move horizontally. Steering arm 20 is connected to tierod 19 to control the steering of wheels 18 and direction of travel of frame 12. Steering arm 20 is controlled by support fork 14 through a link 21.

Figure 4:
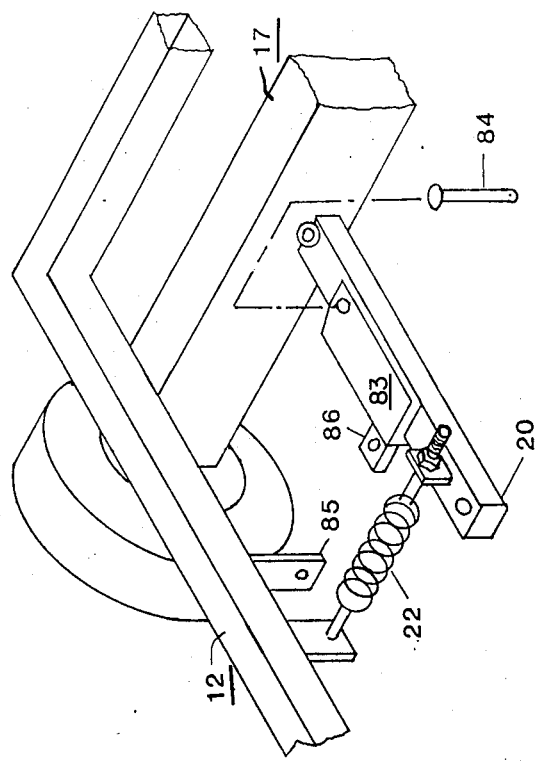
FIG. 4 is a perspective view of portions of the trailer illustrating a spring arrangement of the follower apparatus.

FIG. 4 illustrates a spring 22 in tension between frame 12 and a steering arm 20. Spring 22 biases steering arm 20 toward the fence, rail or barrier for thus steering frame 12 in that direction. Frame 12 will continue to steer in this direction until pressure wheel 13 in FIG. 1 contacts the fence, rail or other barrier. As wheel 13 contacts the horizontal members of the fence, rail, etc., it will move support fork 14 in FIG. 3 away from the rail and thru link 21 move steering arm 20 which will steer frame 12 away from the rail until a state of equilibrium is reached. Through the forces of the tension spring and pressure wheel a uniform horizontal distance will be maintained between the previously described posts and frame 12.

The automatic steering feature may be locked for manual control or transporting as illustrated in FIG. 4. A locking bracket 83 is attached to steerig arm 20 by a pin 84. By the connection of a double acting hydraulic cylinder (not shown) between brackets 85 and 86, the free end of locking bracket 83 can be moved away from steering arm 20. This will allow arm 20 to respond to the pressure wheel and spring for automatic steering. By extending the hydraulic cylinder thus moving locking bracket 83 to steering. By extending the hydraulic cylinder thus moving locking bracket 83 to steering arm 20, the steering arm is held centered by spring action and locking bracket 83.

Figure 5:
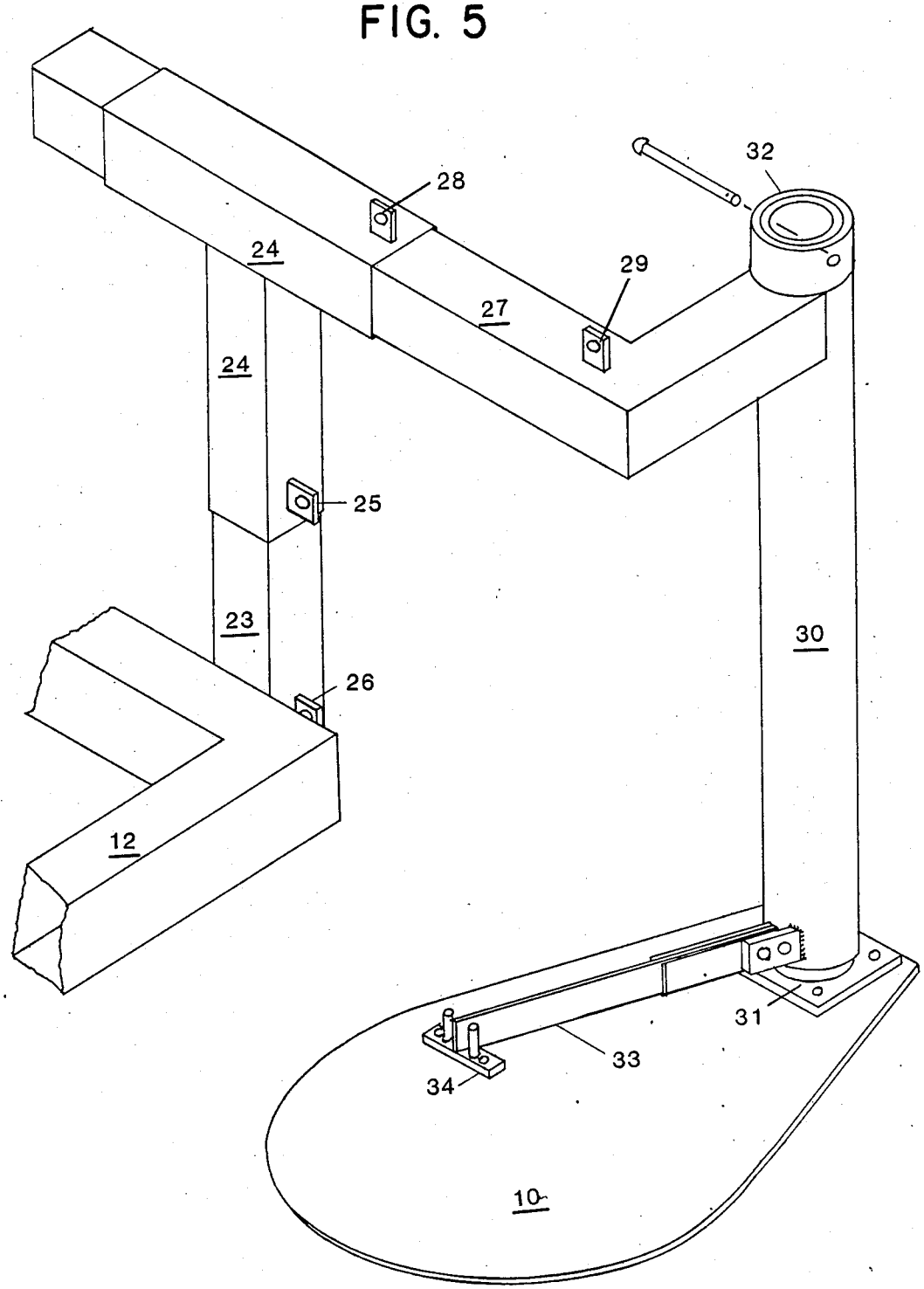
FIG. 5 is a perspective view of portions of the mowing apparatus, illustrating a single mower unit for mowing the inside of a fence or guardrail.

FIG. 5 illustrates the right front corner of frame 12 and mower head 10, i.e., the inner mower. Mower head 10 is carried on frame 12 through an adjustable arm arrangement. Mast 23 is being attached vertically to frame 12, the vertical leg of tee member 24 telescoping over mast 23. A double acting hydraulic cylinder (not shown) is connected between brackets 25 and 26 for providing vertical adjustment of tee 24 with respect to frame 12.

An arm 27 telescopes through the horizontal leg of tee 24. A double acting hydraulic cylinder connected between a pair of brackets 28 and 29 to provide horizontal adjustment of arm 27 with respect to frame 12. A circular post 30 is attached to arm 27 in a vertical position. An inner stem which is bolted to deck, or head, 10 is fitted into post 30 and is free to rotate. A collar 32 is pinned to stem 31 to maintain their vertical relationship. The horizontal or rotational relationship of deck 10 with respect to frame 12 is maintained by a leaf spring 33 which is cantilevered from post 30 with its free end confined in a bracket 34 to maintain a fixed position on deck 10. As deck 10 contacts a fixed object, spring 33 flexes and allows stem 31 to rotate in post 30 so that deck 10 can slide past the object and immediately return to its previous position. The cutting features of deck 10 will be described later.

Figure 3:
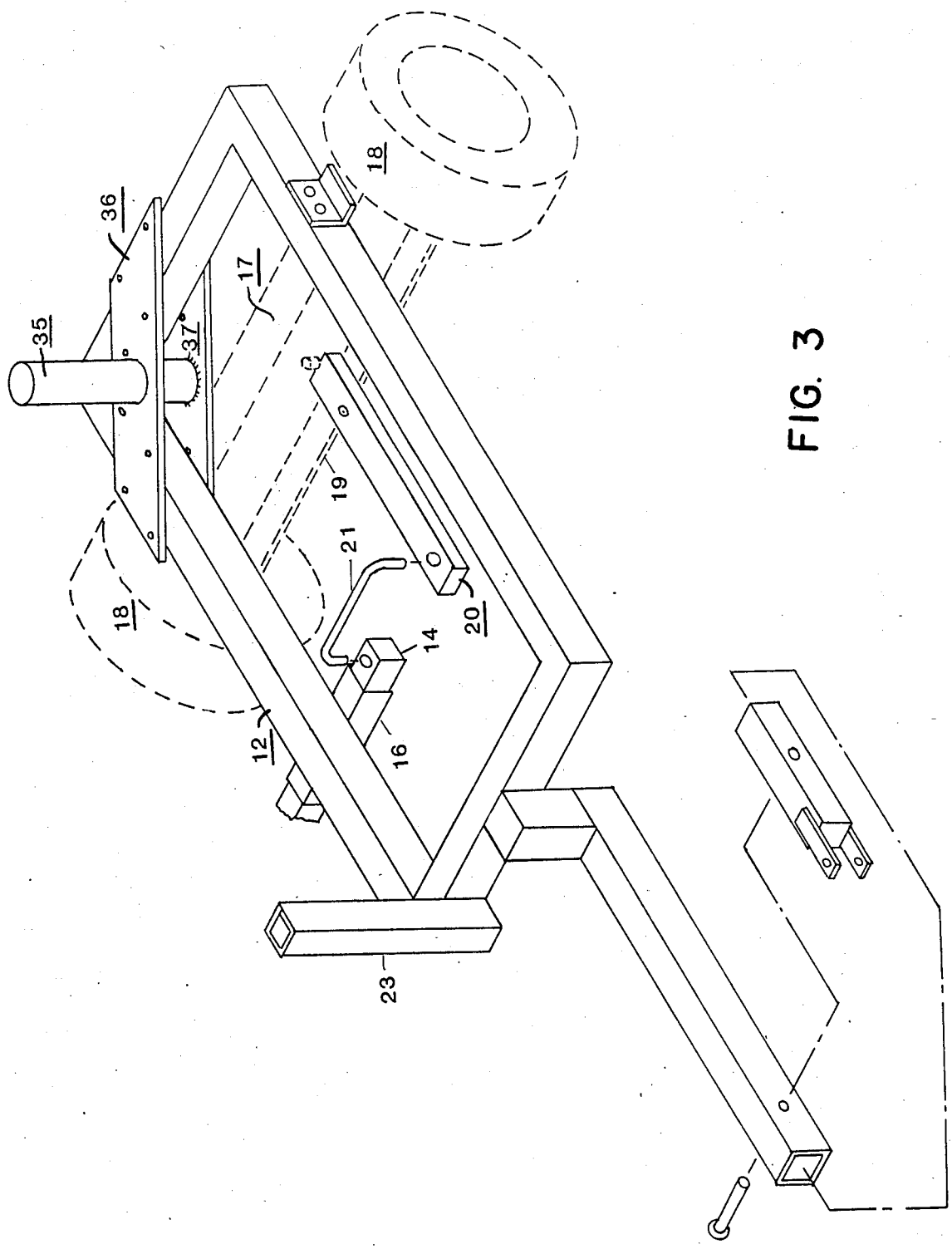
FIG. 3 is a perspective view of a trailer and structure thereof utilized in construction of the new mowing apparatus.

Referring to FIG. 3 in addition to FIG. 1, outer mower deck 11 is carried on frame 12 by a support arrangement including a post 35 supported on frame 12 by plates 36 and 37. A mast 38 (FIG. 6) rotates horizontally about post 35 to move the outer mower deck from mowing to transport position of mast 38 and a hydraulic cylinder (not shown) connected between bracket 41 and 42 provides the vertical control of the outer mower deck.

Figure 6:
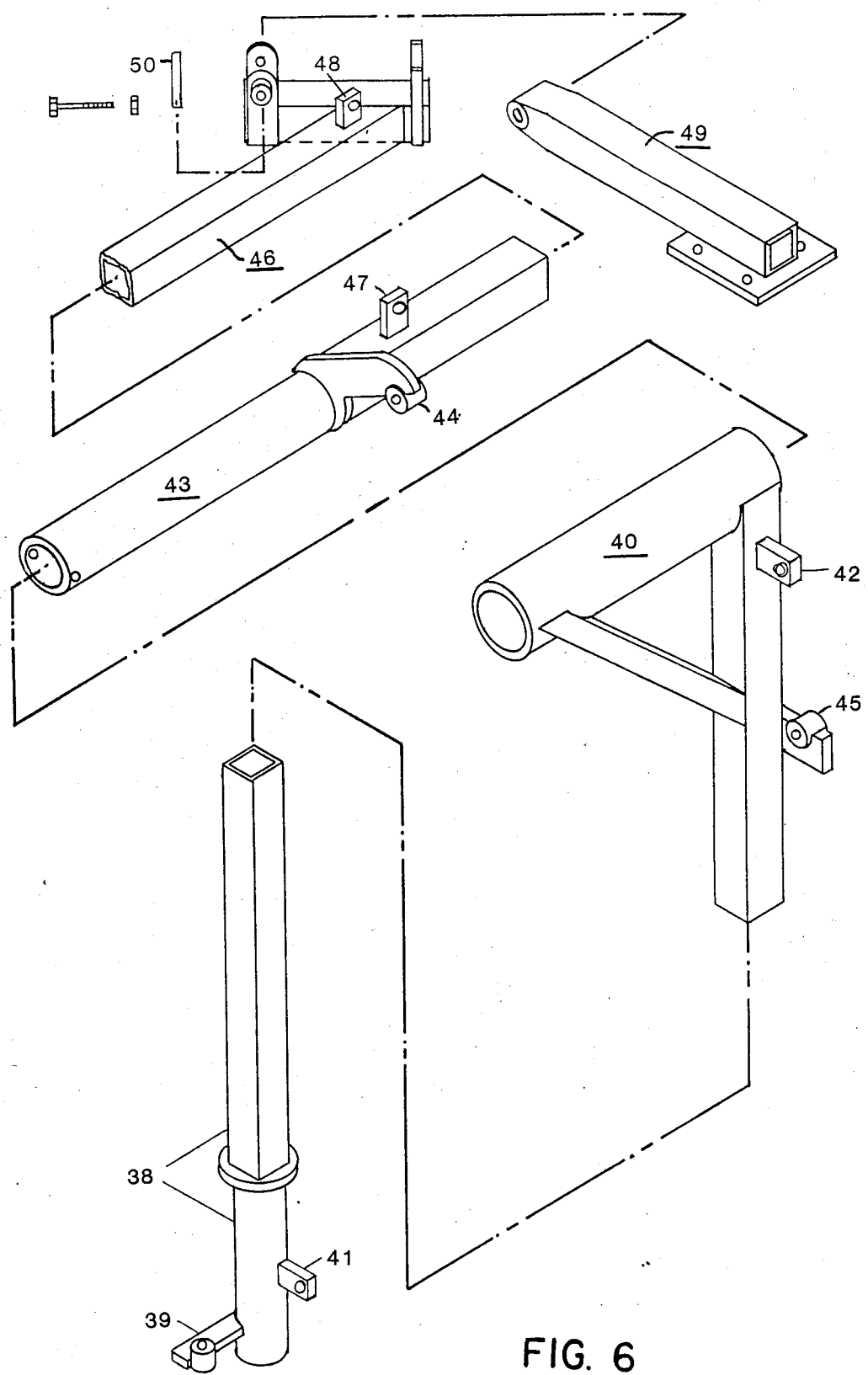
FIG. 6 is an exploded assembly view, in perspective, of portions of a support arrangement for a multiple mowing unit of the new apparatus.

A boom member 43 shown in FIG. 6 rotates within the horizontal leg of frame 40 to support the outer mower deck. A boom member 46 telescopes within member 43 to provide horizontal adjustment of the outer mower deck through a double acting hydraulic cylinder (not shown) connected between bracket 47 and 48. An arm 49 is connected to the outward end of boom member 46 by a pin 50. Outer mower deck 11 is connected to the bracket on arm 49 as illustrated in FIG. 1. Arm 49 (FIG. 6) is normally in a horizontal position with its long axis intersecting the vertical plane of the main frame long axis at preferably 45 degrees with the free end of arms 49 being outward.

The end of arm 49 in FIG. 6 being free and at 45 degrees with the main frame, there is provided a compound relief arrangement for the back mower deck 11, providing an important advantage. Should deck 11 contact a fixed object on its leading edge, arm 49 will provide backward and outward movement of the deck to clear the object and return to mowing position under force of gravity. Should the inboard edge of deck 11 contact a fixed object, the same arm will provide outward and backward movement of the deck as travel progresses then return by force of gravity to mowing position as the object is cleared.

A hydraulic cylinder (not shown) connected between brackets 44 and 45 in shown FIG. 6 to provide rotation of boom members 43 and 46 for raising outer mower deck from mowing position to the level of boom members 43 and 46 to allow positioning the mower deck to the back or outboard side of fence, rail or line of posts to be mowed.

Figure 7:
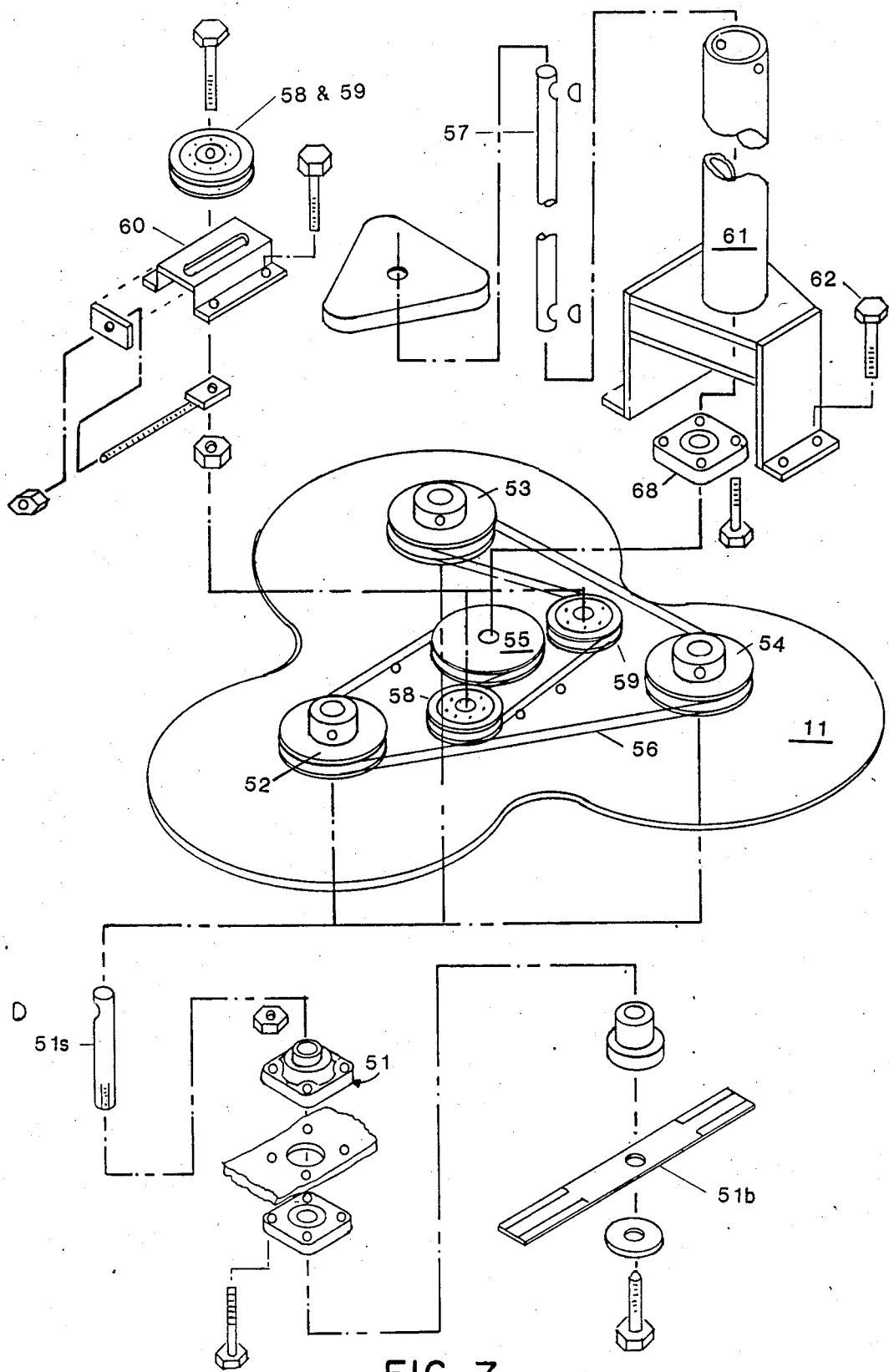
FIG. 7 is an exploded assembly view, in perspective, of elements of the multiple mower unit of the new apparatus.

FIG. 7 illustrates outer mower deck 11 and its component. Spindle assembly 51 fits under each of pulleys 52, 53 and 54 to provide a multi-spindle mower. These pulleys each drive a spindle, as at 51s, which rotates a responsive mower blade, as at 51b. The centers of pulley 52, 53 and 54 are on the points of an equilateral triangle, thus equally spacing the blades. The pulleys are driven by a single pulley 55 through a belt 56, and is turn driven by a shaft 57 which will be described later. Idler pulleys 58 and 59 provide tension for belt 56 and control its routing. Bracket assembly 60 provides the support and adjustment for idler pulleys 58 and 59.

Figure 8:
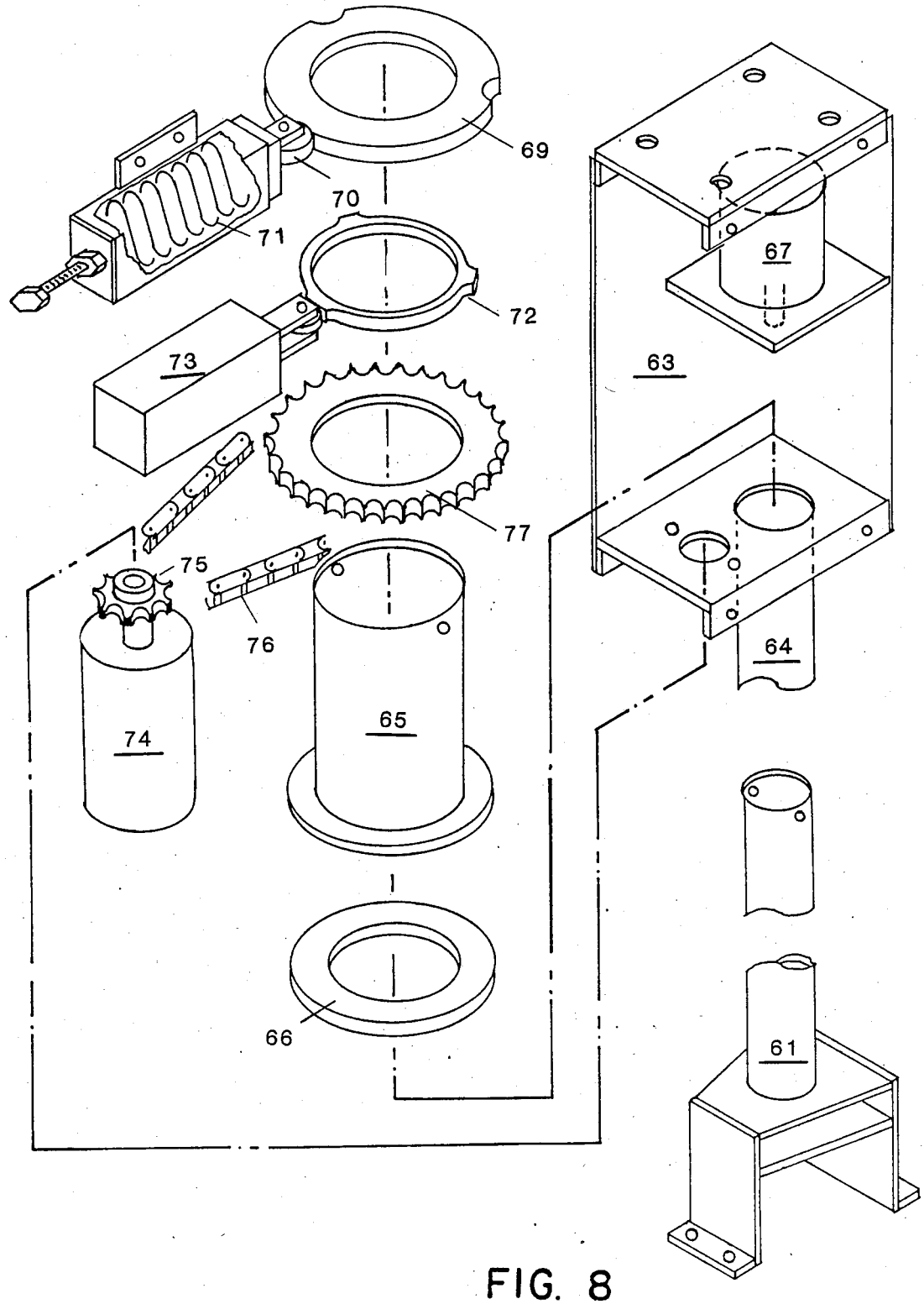
FIG. 8 is an exploded perspective view, illustrating features of the multiple mower unit, including a drive means for causing rotation of the multiple mowing unit.

Mower deck 11 is suspended by stem and bracket assembly 61 connected by bolts 62. Assembly 61 is suspended from a control box 63 as illustrated in FIG. 8. Control box 63 is bolted to the bracket of arm 49 in FIG. 6. The stem and bracket assembly 61 (see FIG. 8) passes through a circular post 64 which is welded to control box 63. Stem 61 is held by passing a control sleeve 65 over it within control box 63. Sleeve 65 rides on a thrust unit 66 within box 63. Pulley 55 shown in FIG. 7 is driven by a shaft 57 within a stem 61. Shaft 57 is supported by a bearing 68 and coupled to a high speed hydraulic motor 67 shown in FIG. 8.

A unique ability of the mowing unit is that it will mow vegetation within a post line, trim around a post when it occurs and continue mowing within post line without impeding the forward motion of the unit. Referring to FIG. 1, this is accomplished by one spindle unit 11' of the outer mower being fixed directly in the post line. As unit 11' contacts a post, it rotates deck 11 such that the throat between 11' and a second spindle unit 11" rotates about the post, trimming about the post and 11" occupies the previous position of vent 11'. Deck 11 rotates one-third revolution each time a post is encountered in the line.

This rotation is accomplished and controlled with components within control box 63 shown in FIG. 8. A control sleeve 65 is bolted to stem and bracket assembly 61; therefore, it will rotate with the outer mower deck. A retaining cam 69 attached to control sleeve 65 will also rotate the outer mower deck. Cam 69 is provided with an arc-shaped recess for each deck spindle for receiving a cam roller 70 which is part of spring loaded cam retainer 71. Cam roller 70 will maintain retaining cam 60 in normal mowing position. When a unit of the outer mower deck contacts a post, torque induced into retaining cam 69, overcoming the spring pressure provided by cam retainer 71 urging roller 70 into a recess of cam 69, allowing the deck to rotate until unit 11" occupies the former position of unit 11' shown in FIG. 1.

An assist cam 72 is also attached to control sleeve 65 and will also rotate. A small rotation of the deck and assist cam 72 will activate a cam-operated hydraulic valve 73 which is suitably connected for controlling delivery of hydraulic fluid to a slow speed hydraulic motor 74. Thus, activation of valve 73 produced by slight rotation of cam 72 causes operation of motor 74 for driving a chain sprocket 75 coupled through a roller chain 76 to a driver sprocket 77 attached to control sleeve 65. Rotational assistance of hydraulic motor 74 thereby reduces rotation force exerted by a post on the outer deck. Lobes on assist cam 72 both start and stop hydraulic motor 74.

Figure 9:
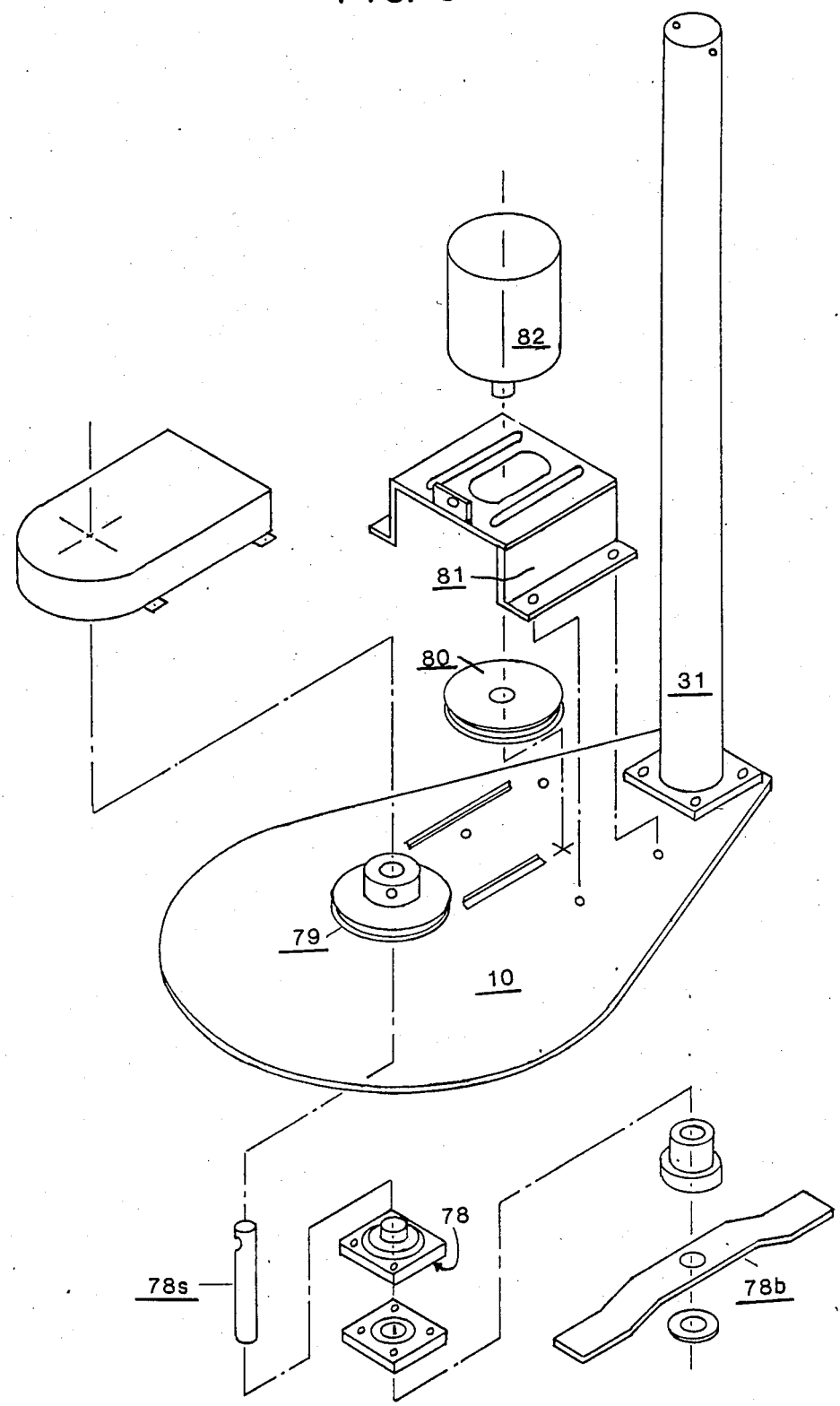
FIG. 9 is an exploded perspective view illustrating elements of a single mower unit of the apparatus.

FIG. 9 illustrates the inner mower deck and its components. Deck 10 contains one spindle assembly 78 which is driven by a pulley 79. Assembly 78 includes a spindle 78s for turning a blade 78b. Pulley 79 is driven by belt from a pulley 80. A bracket 81 provides the mounting and adjustment for hydraulic motor 82 relative to drive pulley 80.

The mower is provided with a conventional self-contained hydraulic unit (not shown) including pump, reservoir, filters and hydraulic valves. the pump being driven by an engine or power shaft from the towing tractor or vehicle. The hydraulic valves are preferably solenoid actuated by a remote switch box mountable on the towing vehicle.

In view of the foregoing, it will be seen that the several objects of the invention are achieved and other advantages are attained.

Thus it is seen that the invention provides mowing apparatus for mowing vegetation under and on both sides of a guardrail or the like along any road or other vehicular route, such as a highway or the like. The apparatus comprises a trailer for being pulled by a towing vehicle, there being a first (rear) rotary mowing unit and a second (front) rotary mowing unit. A first extensible-retractable boom extends laterally from the trailer, there being a first post extending downwardly from an outer end of the first boom for carrying the first mowing unit and for positioning it for mowing along the outside of the guardrail, and means rotatably connecting the first mowing unit to a lower end of the first post for rotation thereabout in response to meeting obstructions. A second extensible-retractable boom also extends laterally from the trailer, there being a second post extending downwardly from an outer end of the second boom for carrying the second mowing unit and for positioning it for mowing along the inside of the guardrail, and means rotatably connecting the second mowing unit to a lower end of the second post for rotation thereabout in response to meeting obstructions. Further, there is provided self-steering means, including a pressure wheel for rolling engagement of the guardrail, for causing the trailer to be self-steering to maintain the trailer proximate to guardrail while being pulled. The first mowing unit includes three rotary blades and a deck having three petal-shaped portions extending over and covering respective blades. The deck is rotatably connected centrally by the connecting means to the lower end of the first post for causing at least one of the deck portions to extend under the guardrail for mowing vegetation under the guardrail. If a deck portion extending under the guardrail meets a guardrail post or other upwardly projecting obstruction, it causes rotation of the deck about the first post, being assisted by hydraulic drive means, to bring another deck portion successively into mowing position beneath the guardrail. Similarly, the second mowing unit is pivotally connected to the lower end of the second post in trailing relation for pivoting out of the way in response to meeting an obstruction.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. Mowing apparatus for simultaneously mowing vegetation under and on both sides of a guardrail or the like along the side of a road, comprising a vehicle for movement along the road, a first rotary mowing unit carried by and extending from the vehicle for mowing along one side of the guardrail, and a second rotary mowing unit carried by and extending from the vehicle for mowing along the other side of the guardrail, and means supporting both of said units for movement about respective vertical axes for permitting rotation of the respective unit for movement between positions under the guardrail for mowing vegetation under the guardrail and out from under the guardrail for clearance of obstructions, the first rotary mowing unit having multiple rotary blades and comprising a deck rotatable about its vertical axis having three petal-shaped portions extending over and covering respective blades, the petal-shaped portions defining cusps between adjacent portions, the deck portions causing rotation of the first rotary mowing unit about its vertical axis upon meeting an obstruction to bring another deck portion into mowing position under the guardrail, and means for providing power-assisted rotation of the first rotary mowing unit in response to one of the deck portions meeting an obstruction, the supporting means comprising an extensible-retractable boom extending laterally from the vehicle and a post connected to an outer end of the boom in depending relation, the post defining the vertical axis of the first rotary mowing unit, the deck being rotatably connected to a lower end of the post, the post being connected to the boom outer end by an arm extending rearwardly from the boom outer end at an angle to a longitudinal axis of the vehicle, and pivot means swingably affixing an upper end of the post to an outer end of the point for permitting rearward and outward swing movement of the post about a pivot axis laterally offset from the vertical axis of the first rotary mowing unit deck upon striking thereof of an object and for return thereof under force of gravity to a mowing position upon clearance of the object.

2. Mowing apparatus as set forth in claim 1 wherein the first rotary mowing unit is positioned for mowing along the outside of the guardrail and the second rotary mowing unit is positioned for mowing along the inside of the guardrail.

3. Mowing apparatus for simultaneously mowing vegetation under and on both sides of a guardrail or the like along the side of a road, comprising a vehicle for movement along the road, a first rotary mowing unit carried by and extending from the vehicle for mowing along one side of the guardrail, and a second rotary mowing unit carried by and extending from the vehicle for mowing along the other side of the guardrail, and means supporting at least a first one of said units for movement about a vertical axis for permitting rotation of the unit for movement between positions under the guardrail for mowing vegetation under the guardrail and out from under the guardrail for clearance of obstructions, the first rotary mowing unit having multiple rotary blades and comprising a deck rotatable about the vertical axis having three petal-shaped portions extending over and covering respective blades, the petal-shaped portions defining cusps between adjacent portions, the deck portions causing rotation of the first rotary mowing unit about the vertical axis upon meeting an obstruction to bring another deck portion into mowing position under the guardrail, and means for providing power-assisted rotation of the first rotary mowing unit upon one of the deck portions meeting an obstruction comprising rotation drive means, a cam driven by rotation of the deck, and cam-follower means for controlling the rotation drive means to provide power for driven rotation of the deck in response to an initial rotation of the deck caused by meeting an obstruction.

4. Mowing apparatus as set forth in claim 3 wherein the cam defines three positions spaced at even arcuate intervals about the vertical axis for stable corresponding successive positions of respective deck portions, the rotation drive means causing driven rotation to successive one such stable positions in response to an initial rotation caused by meeting an obstruction.

5. Mowing apparatus as set forth in claim 4 wherein the drive means is a slow speed hydraulic motor connected in driving relation to the deck.

6. Mowing apparatus for simultaneously mowing vegetation under and on both sides of a guardrail or the like along the side of a road, comprising a vehicle for movement along the road, a first rotary mowing unit carried by and extending from the vehicle for mowing along one side of the guardrail, and a second rotary mowing unit carried by and extending from the vehicle for mowing along the other side of the guardrail, and means supporting at least a first one of said units for movement about a vertical axis for permitting rotation of the unit for movement between positions under the guardrail for mowing vegetation under the guardrail and out from under the guardrail for clearance of obstructions, the first rotary mowing unit having multiple rotary blades and comprising a deck rotatable about the verticle axis having three petal-shaped portions extending over and covering respective blades, the petal-shaped portions defining cusps between adjacent portions, the deck portions causing rotation of the first rotary mowing unit about the vertical axis upon meeting an obstruction to bring another deck portion into mowing position under the guardrail, the first rotary mowing unit being positioned for mowing along the outside of the guardrail and the second rotary mowing unit being positioned for mowing along the inside of the guardrail, the supporting means comprising an extensible-retractable boom extending laterally from the vehicle and a post connected to an outer end of the boom in depending relation, the post defining the vertical axis, the deck being rotatably connected to a lower end of the post.

7. Mowing apparatus as set forth in claim 6, the post being connected to boom outer end by an arm extending rearwardly from the boom outer end at an angle to a longitudinal axis of the vehicle, and pivot means swingably affixing an upper end of the post to an outer end of the arm for permitting rearward and outward swinging movement of the post upon the first rotary mowing unit deck striking an object and for return of said deck under force of gravity to a mowing position upon clearance of the object.

8. Mowing apparatus as set forth in claim 7, further comprising means for rotating the arm about the axis of the boom for selective movement of the post and first mowing unit into and out of mowing position along the outside of the guardrail.

9. Mowing apparatus as set forth in claim 6, further comprising a second extensible-retractable boom extending laterally from the vehicle and means connecting the second mowing unit to the outer end of the second boom for rotation of the second mowing unit about a second vertical axis for clearance of obstructions.

10. Mowing apparatus as set forth in claim 9, the second mowing unit having at least a single rotary blade and a deck extending over and covering such blade, there being a second post depending from the outer end of the second boom for supporting the second mowing unit, the deck thereof being rotatably connected to a lower end of the second post.

11. Mowing apparatus as set forth in claim 10, the second mowing unit deck being connected to the second post lower end in trailing relation, and spring means interconnecting the second deck and second post for resiliently urging the second deck into mowing position but permitting compliant movement of the second deck upon striking an object.

12. Mowing apparatus for simultaneously mowing vegetation under and on both sides of a guardrail or the like along the side of a road, comprising a vehicle for movement along the road, a first rotary mowing unit carried by and extending from the vehicle for mowing along one side of the guardrail, and a second rotary mowing unit carried by and extending from the vehicle for mowing along the other side of the guardrail, and means supporting at least one of said units for movement about a vertical axis for permitting rotation of the unit for movement between positions under the guardrail for mowing vegetation under the guardrail and out from under the guardrail for clearance of obstructions, the vehicle comprising a trailer for being pulled by a pulling vehicle, the trailer having at least one axle, including steerable means connected with the axle for steering the trailer into position proximate a guardrail for said mowing.

13. Mowing apparatus as set forth in claim 11, the steering means comprising a pressure wheel carried by the trailer for rolling engagement with the guardrail, and linkage means operatively interconnecting the pressure wheel and steerable wheels for causing the trailer to maintain the pressure wheel in rolling engagement with the guardrail by self-steering of the steerable wheels, whereby to maintain the trailer proximate the guardrail while being pulled.

14. Mowing apparatus as set forth in claim 13, the axle being of steerable type and including a steering arm, the pressure wheel being carried by a supporting member extending laterally from the trailer and connected to the steering arm, and spring means biasing the steering arm in a direction for steering the trailer toward the guardrail.

15. Mowing apparatus for mowing vegetation under and on both sides of a guardrail or the like along a vehicular route, the apparatus comprising a trailer for being pulled by a towing vehicle, a first rotary mowing unit, a first extensible-retractable boom extending laterally from the trailer and a first post extending downwardly from an outer end of the first for carrying the first mowing unit and for positioning it for mowing along the outside of the guardrail, means rotatably connecting the first mowing unit, a second end of the first post for rotation thereabout in response to meeting obstructions, a second rotary mowing unit, a second extensible-retractable boom extending laterally from the trailer and a second post extending downwardly from an outer end of the second boom for carrying the second mowing unit and for positioning it for mowing along the inside of the guardrail, means rotatably connecting the second mowing unit to a lower end of the second post for rotation thereabout in response to meeting obstructions, and self-steering means for causing the trailer to be self-steering to maintain the trailer proximate to guardrail while being pulled.

16. Mowing apparatus as set forth in claim 15, the first mowing unit including multiple rotary blades and a deck having portions extending over and covering respective blades, the deck being rotatably connected centrally by the connecting means to the lower end of the first post for causing at least one of the deck portions to extend under the guardrail for mowing vegetation under the guardrail, said at least one of the deck portions causing rotation of the deck about the first post in response to meeting a guardrail post or other obstruction to bring another deck portion into mowing position beneath the guardrail.

* * * * *

UNITED STATES PATENT AND TRADEMARK OFFICE
CERTIFICATE OF CORRECTION

PATENT NO. : 4,697,405
DATED : October 6, 1987
INVENTOR(S) : Carl DeWitt and Gerald A. Fink It is certified that error appears in the above-identified patent and that said Letters Patent is hereby corrected as shown below:

Column 10, line 23 - ", a second" should be -- to a lower --
                         (Claim 15)

Signed and Sealed this

Twelfth Day of April, 1988

Attest:

DONALD J. QUIGG

Attesting Officer      Commissioner of Patents and Trademarks